United States Patent
Koukan et al.

(10) Patent No.: US 10,807,463 B2
(45) Date of Patent: Oct. 20, 2020

(54) LINE TERMINATION ELEMENT FOR A VENTILATION OUTLET OF A FLUID CONTAINER, AND FLUID CONTAINER

(71) Applicant: KAUTEX TEXTRON GMBH & CO. KG, Bonn (DE)

(72) Inventors: Ibrahim Koukan, Cologne (DE); Nicolai Schumacher, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 186 days.

(21) Appl. No.: 15/548,328

(22) PCT Filed: Feb. 1, 2016

(86) PCT No.: PCT/EP2016/052089
§ 371 (c)(1),
(2) Date: Aug. 2, 2017

(87) PCT Pub. No.: WO2016/124551
PCT Pub. Date: Aug. 11, 2016

(65) Prior Publication Data
US 2018/0022212 A1 Jan. 25, 2018

(30) Foreign Application Priority Data
Feb. 2, 2015 (DE) .................. 10 2015 201 772

(51) Int. Cl.
*F16K 15/14* (2006.01)
*B60K 15/035* (2006.01)
(Continued)

(52) U.S. Cl.
CPC ...... *B60K 15/03519* (2013.01); *B60K 15/035* (2013.01); *F02M 59/462* (2013.01);
(Continued)

(58) Field of Classification Search
CPC ............ F16K 15/148; B60K 15/03519; B60K 15/035; B60K 2015/03236; F02C 7/232
See application file for complete search history.

(56) References Cited

U.S. PATENT DOCUMENTS 5,129,426 A 7/1992 Boehmer
5,419,366 A 5/1995 Johnston
(Continued)

FOREIGN PATENT DOCUMENTS

DE 824578 12/1951
DE 102014201780 8/2015
(Continued)

OTHER PUBLICATIONS

English translation of International Search Report dated Apr. 22, 2016, received in corresponding PCT Application No. PCT/EP2016/052089.

(Continued)

*Primary Examiner* — P. Macade Nichols
(74) *Attorney, Agent, or Firm* — Grossman, Tucker, Perreault & Pfleger, PLLC

(57) ABSTRACT

The invention relates to a line termination element (4) for a ventilation outlet of a fluid container (5), having a main body (2) which is formed as a closure element for a free end (3) of the ventilation outlet and which is cross-sectionally matched to the cross section of the ventilation outlet, comprising at least one flow passage as an insect barrier, which flow passage is smaller than a mouth cross section (17) of the ventilation outlet, and also at least one valve body (10), which, in a first position, closes off the mouth cross section (17) of the ventilation outlet and, in a second position, opens up the mouth cross section (17) of the ventilation outlet.

23 Claims, 3 Drawing Sheets

Figure 1:
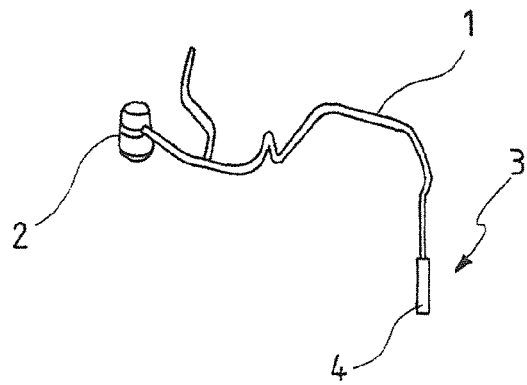

(51) Int. Cl.
   *F16K 27/12*   (2006.01)
   *F02M 59/46*   (2006.01)
   *B60K 15/03*   (2006.01)
   *F02C 7/232*   (2006.01)

(52) U.S. Cl.
   CPC ............ *F16K 15/148* (2013.01); *F16K 27/12* (2013.01); *B60K 2015/03236* (2013.01); *F01N 2610/1466* (2013.01); *F02C 7/232* (2013.01)

(56)              References Cited

U.S. PATENT DOCUMENTS

2011/0083771 A1   4/2011   Whelan et al.
2011/0084076 A1   4/2011   Whelan et al.

FOREIGN PATENT DOCUMENTS

EP     2783943     10/2014
GB     2314789     1/1998

OTHER PUBLICATIONS

English translation of International Preliminary Report on Patentability dated May 29, 2017, received in corresponding PCT Application No. PCT/EP2016/052089.
Office Action from related Chinese Appln. No. 201680010121.1, dated Aug. 28, 2018. English translation attached.
Office Action from related Chinese Appln. No. 201680010121.1, dated May 15, 2019. English translation attached.

LINE TERMINATION ELEMENT FOR A VENTILATION OUTLET OF A FLUID CONTAINER, AND FLUID CONTAINER

The invention relates to a line termination element for a ventilation outlet of a fluid container, and to a fluid container.

In the context of the present invention, a fluid container may be for example a fuel tank arranged in a motor vehicle, a container for accommodating windshield washer fluid, a container for accommodating a liquid additive for exhaust-gas denitrification or the like.

In the context of the present invention, a ventilation outlet may be for example an aeration line or a ventilation line or a connecting piece or a connecting nipple of a fluid container.

It is known in principle to provide openings and valves in/on such containers with sieves, insect screens or other barriers, which reliably prevent entry of insects or other impurities into the volume of the container. For this purpose, on known fluid containers, valves which have a valve housing, a valve body arranged in the valve housing, and if appropriate a diaphragm and an insect screen are often provided. The valve prevents liquid escaping from the container in the case of an upside-down position of the container, or ensures pressure equalization between the volume of the container and the surroundings. In some applications, the valve simultaneously prevents drying-out of the fluid container.

The above-described valves on a fluid container have to be inserted into corresponding openings of the fluid container. The size of the valve housing depends on the number of functions to be ensured by the valve. In the wall of the fluid container, correspondingly large openings have to be provided, this not necessarily being desirable in the case of integrally formed fluid containers composed of thermoplastic. In some circumstances, moving parts of the valves come into contact with the liquid inside the fluid container, this likewise being undesirable, depending on the contents of the fluid container. Furthermore, the production of valves which have to ensure a multiplicity of functions is relatively complex.

The invention is therefore based on the object of providing an arrangement which is as simple as possible and with which a valve function on a fluid container can be ensured and which is relatively easily retrofittable. Furthermore, the invention is based on the object of providing a relatively easily retrofittable arrangement which fulfills the function of an insect barrier. The arrangement should in particular be producible in a simple and low-cost manner.

The object on which the invention is based is achieved by a line termination element having the features of claim 1. Advantageous refinements of the invention can be gathered from the subclaims.

According to one aspect of the invention, a line termination element for a ventilation outlet of a fluid container is provided, having a main body which is formed as a closure element for a free end of the ventilation outlet and which is cross-sectionally matched to the cross section of the ventilation outlet, comprising at least one flow passage as an insect barrier, which flow passage is smaller than a mouth cross section of the ventilation outlet, and furthermore comprising a valve body, which, in a first position, closes off the mouth cross section of the ventilation outlet and which, in a second position, opens up the mouth cross section of the ventilation outlet.

The arrangement according to the invention, or the line termination element according to the invention, integrates the "spider screen" function and the function of a valve in a relatively compact structural part, which is relatively easily retrofittable.

Care is taken to ensure, in particular in the case of a fluid container composed of thermoplastic, which is provided for accommodating an additive for exhaust-gas denitrification, that the fluid container does not dry out. The drying-out of the container represents a problem in particular if the fluid container holds an aqueous urea solution. The urea solution has a tendency to form large crystals which clog or block the ventilation outlet and the valves. For this reason, it is particularly advantageous if valves or other moving parts do not come into direct contact with the liquid accommodated in the fluid container.

According to the invention, it is therefore particularly advantageous if the valve function and the function of a spider screen are integrated in a line termination element which can be arranged at a distance from the container volume or the container wall and which can be fitted relatively easily onto the free end of a ventilation outlet. Such a line termination element requires no separate fastening means, since it can be fitted or clamped onto a free end of a valve of a ventilation outlet in a force-fitting manner or latched with the free end of the ventilation outlet in a form-fitting manner, without further fastening means.

In a preferred variant of the line termination element according to the invention, it is provided that the main body is formed as a closure cap for the free end of the ventilation outlet.

For example, it may be provided that the main body surrounds a receiving space for the free end of the ventilation outlet, and a valve chamber. The ventilation chamber is preferably provided at the end that is remote from the receiving space or in the part of the main body that is arranged at a distance from the receiving space.

In a preferred variant of the line termination element according to the invention, it is provided that the valve body delimits the receiving space for the free end of the ventilation outlet. The valve body may be formed for example as an internal subdivision of the main body. If the valve body is formed so as to be approximately disk-shaped, it forms a partition between the receiving space and the ventilation chamber.

The valve body may delimit the valve chamber in the direction of the receiving space for the free end of the ventilation outlet.

In an advantageous variant of the line termination element according to the invention, it is provided that the main body has, as insect barrier, a multiplicity of flow passages which are preferably formed as circumferentially at least partially encircling slots.

Preferably, the valve body is formed as a mushroom valve having a flexible valve shield and a shaft, wherein, in the first position, the valve shield covers the mouth cross section of the ventilation outlet. In the closed position of the mushroom valve, the valve shield can bear on the mouth cross section of the ventilation outlet. It is possible, for example, for a positive pressure inside the fluid container to cause the valve shield to lift off. However, the valve body may also be installed such that a negative pressure inside the fluid container causes the valve to open. In the valve body, a slot or a bore may be provided which permanently creates pressure equalization between the interior of the fluid container and the atmosphere, wherein delayed pressure equalization with the atmosphere is brought about in the first position of the valve body.

Preferably, the valve shield and the shaft are formed integrally. The shaft of the valve body may be formed for example as a journal which has such a profile that it is insertable captively into a correspondingly dimensioned opening by virtue of the elasticity of its material.

In an advantageous variant of the line termination element according to the invention, it is provided that the receiving space for the free end of the ventilation outlet has enclosure walls which have, projecting into the receiving space, locking projections or locking depressions which interact with corresponding locking depressions of the ventilation outlet.

A further advantageous variant of the line termination element according to the invention is characterized in that the shaft of the valve body passes through an end-side opening of the main body.

For example, the main body may have an end-side depression which is formed as a blind hole and which has a base in which the opening for receiving the shaft of the valve body is provided.

The main body of the line termination element is preferably formed from thermoplastic. This may be formed as an integral, injection-molded structural part.

The thermoplastic of the main body may for example be selected from a group comprising ABS, POM, polyethylene, polypropylene or polyamide.

The valve body may be composed for example of a thermoplastic elastomer, a rubber or some other elastic material.

The object on which the invention is based is furthermore achieved by a fluid container having the features of claim 12. Further advantageous features of the invention can be gathered from the subclaims.

According to a further aspect of the invention, a fluid container composed of thermoplastic is provided, having at least one ventilation outlet, comprising a line termination element having a main body which is formed as a closure element for a free end of the ventilation outlet and which is cross-sectionally matched to the cross section of the ventilation outlet, comprising at least one flow passage as an insect barrier, where the flow passage is smaller than a mouth cross section of the ventilation outlet, and also at least one valve body, which, in a first position, closes off the mouth cross section of the ventilation outlet and which, in a second position, opens up the mouth cross section of the ventilation outlet.

The fluid container may be composed for example of polyethylene, polypropylene or polyamide.

The fluid container may be formed as an extrusion blow-molded container, as an injection-molded container or as a rotationally-sintered container.

The main body is preferably formed as a closure cap or closure plug for the free end of the ventilation outlet and is removably connected to the free end of the ventilation outlet.

The free end of the ventilation outlet may have an insertion profile, wherein the insertion profile is removably inserted into a receiving space of the main body.

In a particularly preferred variant of the fluid container according to the invention, it is provided that the insertion profile interacts in a form-fitting manner with locking means of the line termination element that are formed in a complementary manner with respect thereto.

The insertion profile may be configured for example in the form of what is known as a fir-tree profile.

In principle, the free end of the ventilation outlet may be of smooth-walled design on the outside. Furthermore, the enclosure walls of the receiving space for the free end of the ventilation outlet may also be of smooth-walled design. In this case, it is advantageous if the diameter of the receiving space is matched to the free end of the ventilation outlet such that the ventilation outlet is held in the receiving space in a force-fitting manner.

The invention is explained below on the basis of an exemplary embodiment illustrated in the drawings.

Figure 2:
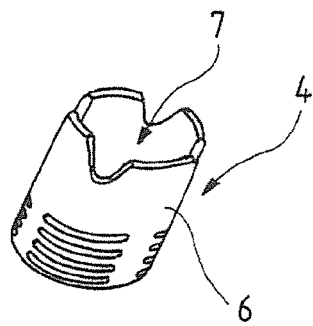
Figure 3:
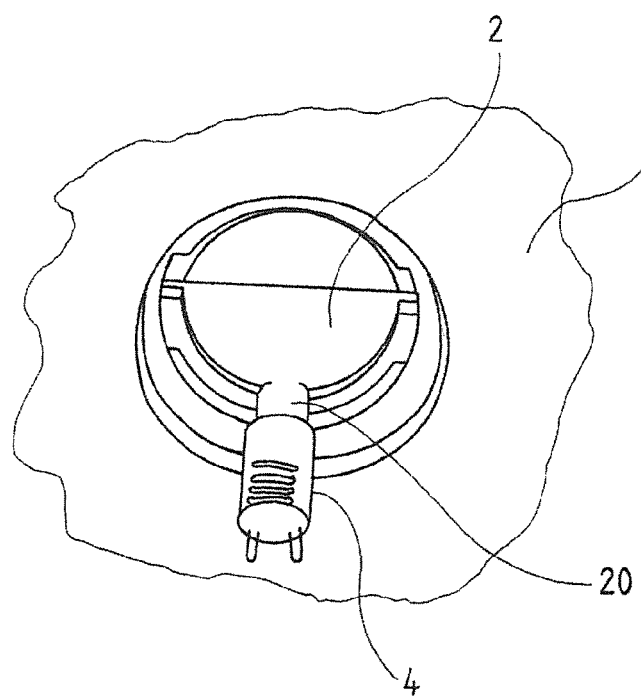
Figure 4:
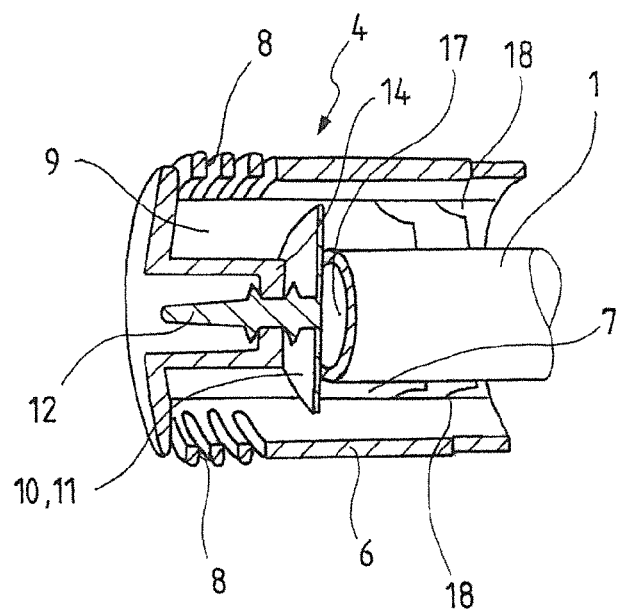
Figure 5:
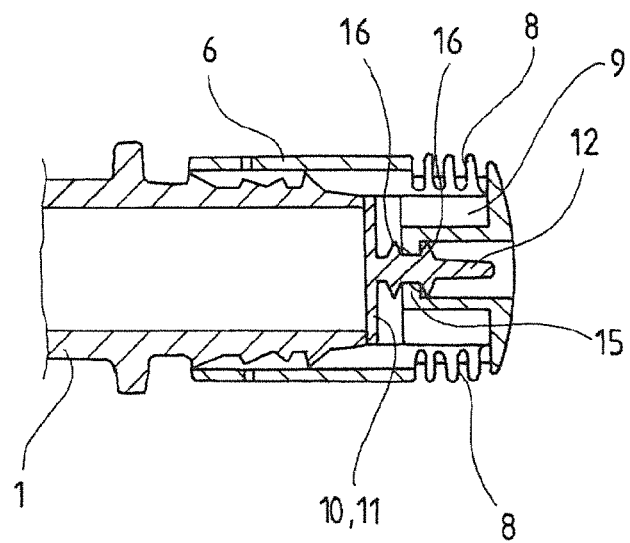
Figure 6:
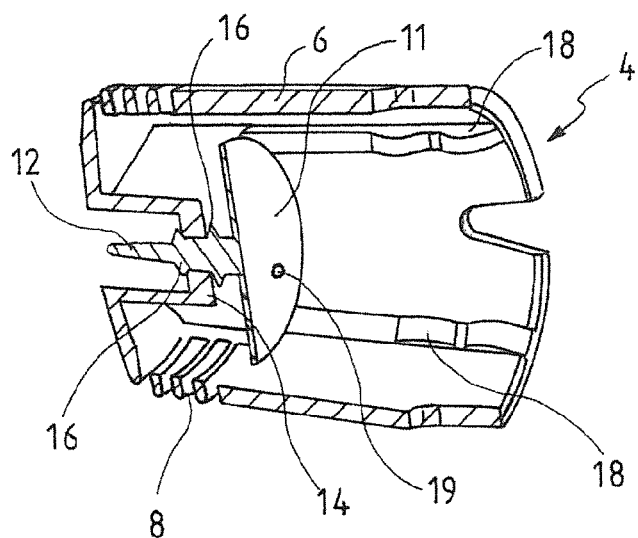
Figure 7:
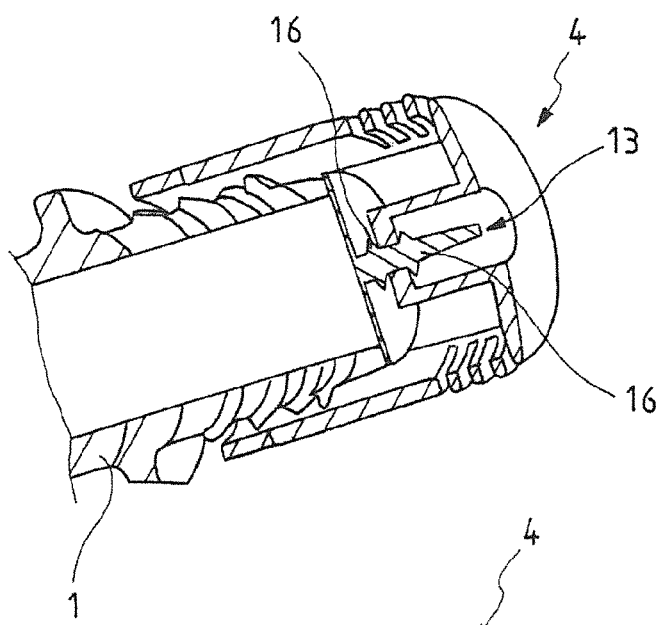
Figure 8:
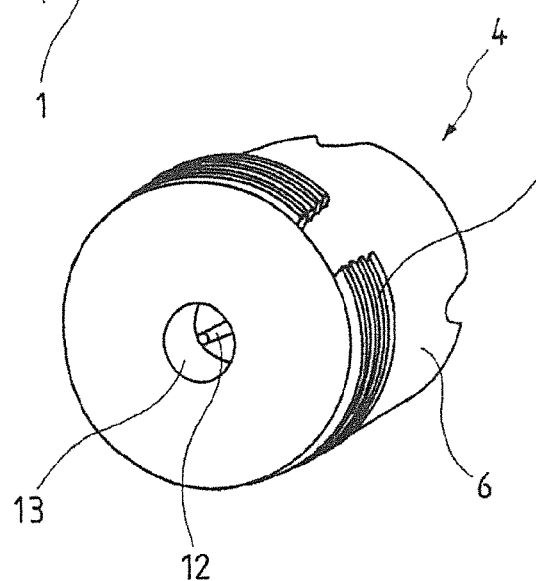

In the drawings:

FIG. 1 shows a ventilation line on a fluid container, wherein the fluid container itself is not illustrated in the figure, FIG. 2 shows a perspective view of the line termination element according to the invention, FIG. 3 shows a connection housing on a fluid container according to the invention having a ventilation outlet onto which a line termination element according to the invention is fitted, FIG. 4 shows a sectional view (partial section) of a line termination element according to the invention with an inserted end of a ventilation outlet, FIG. 5 shows a sectional view of a line termination element according to the invention with an inserted end of a ventilation outlet, wherein the ventilation outlet has a fir-tree profile, FIG. 6 shows a perspective sectional view through the line termination element according to the invention, FIG. 7 shows a perspective sectional view through the line termination element according to the invention with an inserted ventilation outlet, and, FIG. 8 shows a perspective end-side view of the line termination element.

Reference is firstly made to FIG. 1, which shows, as a ventilation outlet, a ventilation line 1 of a fluid container (not illustrated in FIG. 1 for reasons of simplification). The fluid container is formed for example as a urea container for selective catalytic exhaust-gas denitrification. The ventilation line is connected to the fluid container via a connection housing 2.

In the connection housing 2, there may be arranged for example a diaphragm which is gas-permeable and liquid-impermeable. On the end of the ventilation outlet for example may be run into a wheel housing of a passenger car. In order to prevent any entry of dirt and of insects into the ventilation outlet, a line termination element 4 according to the invention is fitted onto the free end 3 thereof.

Another variant of a ventilation outlet on a fluid container 5 is illustrated in FIG. 3. FIG. 5 partially illustrates only an upper container wall, in the installed position, of the fluid container 5. Inserted into the upper container wall of the fluid container 5 is a connection housing 2 which has, as ventilation outlet, a line connecting piece 20 onto which the line termination element 4 according to the invention is fitted.

The line termination element 4 illustrated in FIGS. 2 and 4-8 is formed as a closure cap having an approximately cylindrical main body 6. The main body surrounds a cylindrical receiving space 7 for the free end 3 of the ventilation outlet.

FIG. 2 shows a perspective view of the line termination element 4 without the ventilation outlet inserted thereinto.

As can be seen in substantially all the figures, the main body 6 is provided at its circumference with a multiplicity of partially encircling slots 8 which, in the context of the invention, each form a flow passage as an insect barrier. It goes without saying that small holes or small, differently shaped perforations may be provided instead of slots.

The slots 8 open into a ventilation chamber 9 of the line termination element 4, which chamber is separated from the receiving space 7 for the free end 3 of the ventilation outlet by a valve body 10. The valve body 10 is formed as what is known as a mushroom valve having a valve shield 11 and a shaft 12. The valve shield 11 has the shape of a disk. The valve body 10 consists of a flexible and elastic material, for example of a thermoplastic elastomer. The shaft 12 is formed integrally on the valve shield 11.

Provided in the end side of the main body 6, is a depression, in the form of a blind hole 13, which has a base 14. Provided in the base is an opening 15 into which the shaft 12 of the valve body 10 is inserted. The shaft 12 is of conical design, wherein the shaft 12 is formed so as to taper to a point from the valve shield 11 to a remote end. The shaft 12 is furthermore provided at its circumference with two encircling collars 16 which hold the shaft 12 securely in the opening 15. On account of this configuration of the shaft 12, it is possible for the valve body 10 to be pressed into the opening 15 through the application of deformation forces.

On account of the design of the blind hole 13, it is possible for the valve body 10 to be fitted inside the volume surrounded by the main body 6 such that said valve body delimits the ventilation chamber 9 with respect to the receiving space 7 and, in the case of the free end 3 of the ventilation outlet inserted into the receiving space, bears against a mouth cross section 17 of the ventilation outlet.

In the configuration of the mushroom valve, or of the valve body 10, shown in the figures, the valve body 10 closes off the mouth opening 17 of the ventilation outlet if no positive pressure prevails inside the fluid container 5.

During the fitting of the line termination element 4 on the ventilation outlet, the ventilation outlet, or its free end 3, can be inserted so deeply into the receiving space 7 that the end side or the mouth cross section 17 of the ventilation outlet bears against the valve shield 11.

In the variant of the line termination element 4 shown in FIG. 4, the interior enclosure walls of the receiving space 7 are provided with ribs 18 which project into the receiving space 7 and bring about a narrowing of the cross section of the receiving space 7. If the ventilation outlet is correspondingly flexible, it will be clamped in the receiving space 7, as is illustrated in FIG. 4.

An alternative variant of the fastening of the line termination element 4 is illustrated in FIG. 5. The enclosure walls of the receiving space 7 are of smooth-walled design on the inside, while in contrast, the ventilation outlet is provided with an insertion profile which is formed as a fir-tree profile in the variant illustrated in FIG. 5.

FIG. 6 shows a perspective view of the line termination element 4 with internally encircling ribs 18 without the inserted free end 3 of the ventilation outlet.

FIG. 7 shows a perspective illustration (sectional view) of the line termination element 4 according to FIG. 5.

FIG. 8 shows a front-end view of the line termination element 4 which accords a view into the blind hole 13. As can be seen from FIG. 8, the shaft 12 inserted into the opening 15 is visible from the outside. This configuration of the line termination element 4 allows visual monitoring of the integrity of the mushroom valve.

LIST OF REFERENCE SIGNS

1 Ventilation line
2 Connection housing
3 Free end of the ventilation outlet
4 Line termination element
5 Fluid container
6 Main body
7 Receiving space
8 Slots
9 Ventilation chamber
10 Valve body
11 Valve shield
12 Shaft
13 Blind hole
14 Base
15 Opening
16 Collar
17 Mouth cross section
18 Ribs
19 Bore
20 Line connecting piece

What is claimed is:

1. A line termination element for a ventilation outlet of a fluid container, the line termination element comprising:
    a main body which is formed as a closure element for a free end of the ventilation outlet and which is cross-sectionally matched to a cross section of the ventilation outlet, the main body comprising at least one flow passage as an insect barrier, which flow passage is smaller than a mouth cross section of the ventilation outlet,
    at least one valve body, which, in a first position, closes off the mouth cross section of the ventilation outlet and which, in a second position, opens up the mouth cross section of the ventilation outlet, and
    wherein the main body is a one-piece body.

2. The line termination element as claimed in claim 1, wherein the main body is formed as a closure cap or a closure plug for the free end of the ventilation outlet.

3. The line termination element as claimed in claim 1, wherein the main body surrounds a receiving space for the free end of the ventilation outlet, and surrounds a valve chamber.

4. The line termination element as claimed in claim 3, wherein the valve body delimits the receiving space for the free end of the ventilation outlet.

5. The line termination element as claimed in claim 3, wherein the valve body delimits the valve chamber in a direction of the receiving space for the free end of the ventilation outlet.

6. The line termination element as claimed in claim 5, wherein the receiving space for the free end of the ventilation outlet has at least one enclosure wall which has, projecting into the receiving space, at least one locking depression which is configured to interact with a corresponding locking depression of the ventilation outlet.

7. The line termination element as claimed in claim 1, wherein the at least one flow passage as the insect barrier comprises a plurality of flow passages as the insect barrier.

8. The line termination element as claimed in claim 7, wherein the plurality of flow passages are formed as a plurality of slots.

9. The line termination element as claimed in claim 8, wherein the plurality of slots extend around a circumference of the main body.

10. The line termination element as claimed in claim 1, wherein the valve body is formed as a mushroom valve having a flexible valve shield and a shaft, wherein, in the first position, the valve shield covers the mouth cross section of the ventilation outlet.

11. The line termination element as claimed in claim 10, wherein the valve shield and the shaft are formed integrally as one piece.

12. The line termination element as claimed in claim 10, wherein the shaft of the valve body extends through an end-side opening of the main body.

13. The line termination element as claimed in claim 12, wherein the main body has an external, end-side depression which is formed as a blind hole and which has a base having the end-side opening for through which the shaft of the valve body extends.

14. The line termination element as claimed in claim 1, wherein the at least one flow passage as an insect barrier is disposed at an outer periphery of the main body, and arranged relative to the valve body as to be exposed to contact with insects when the valve body is in the first position or the second position.

15. The line termination element as claimed in claim 1, wherein the one-piece body is an injection molded one-piece body.

16. The line termination element as claimed in claim 1, wherein the one-piece body is formed of plastic.

17. A fluid container comprising:
the fluid container formed of thermoplastic, and having at least one ventilation outlet,
the at least one ventilation outlet comprising a line termination element,
the line termination element comprising a main body which is formed as a closure element for a free end of the ventilation outlet and which is cross-sectionally matched to a cross section of the ventilation outlet, the main body comprising at least one flow passage as an insect barrier, which flow passage is smaller than a mouth cross section of the ventilation outlet,
at least one valve body, which, in a first position, closes off the mouth cross section of the ventilation outlet and which, in a second position, opens up the mouth cross section of the ventilation outlet, and
wherein the main body is a one-piece body.

18. The fluid container as claimed in claim 17, wherein the main body is formed as a closure cap or a closure plug for the free end of the ventilation outlet and is removably connected to the free end of the ventilation outlet.

19. The fluid container as claimed in claim 17, wherein the free end of the ventilation outlet has an insertion profile, and the insertion profile is removably inserted into a receiving space of the main body.

20. The fluid container as claimed in claim 19, wherein the insertion profile interacts in a form-fitting manner with the line termination element.

21. The fluid container as claimed in claim 20, wherein the insertion profile interacts in a form-fitting manner with means of the line termination element that are formed in a complementary manner with respect thereto.

22. The line termination element as claimed in claim 17, wherein the one-piece body is an injection molded one-piece body.

23. The line termination element as claimed in claim 17, wherein the one-piece body is formed of plastic.

\* \* \* \* \*